Dec. 1, 1931.  A. W. CAPS  1,834,897

SPRING BACK COPYHOLDER

Filed Dec. 3, 1927   3 Sheets-Sheet 2

INVENTOR
Arthur W. Caps
BY
his ATTORNEYS

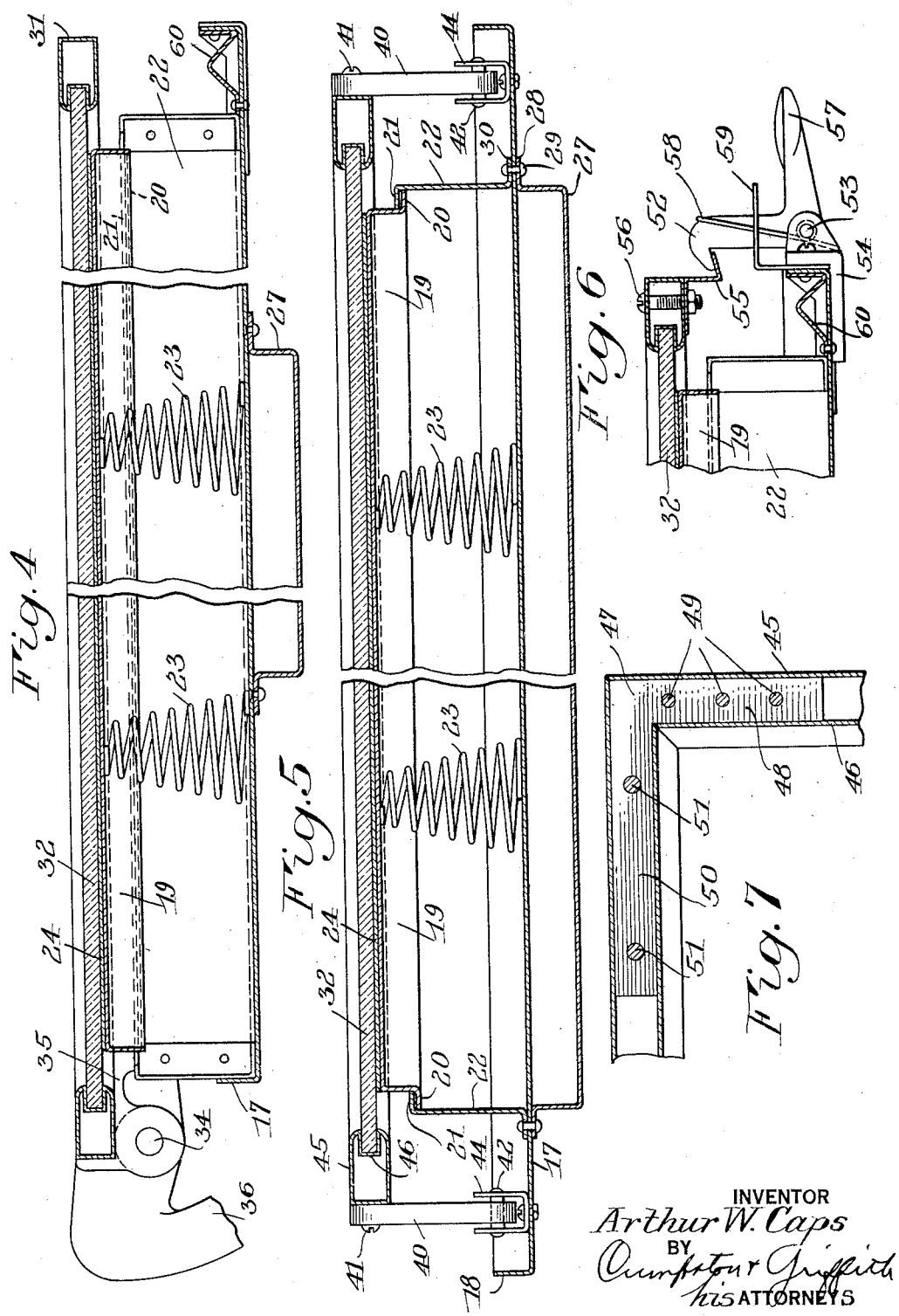

Patented Dec. 1, 1931

1,834,897

UNITED STATES PATENT OFFICE

ARTHUR W. CAPS, OF ROCHESTER, NEW YORK, ASSIGNOR TO PHOTOSTAT CORPORATION, OF PROVIDENCE, RHODE ISLAND, A CORPORATION OF RHODE ISLAND

SPRING BACK COPYHOLDER

Application filed December 3, 1927. Serial No. 237,402.

The present invention relates to photographic apparatus and more especially to an arrangement for holding a document or other similar object to be photographed, one object of the invention being a provision of a simple and efficient device of this character comprising relatively few parts which can be conveniently and rapidly manipulated.

Another object is to provide a holding means for documents and the like which is adapted to hold the document in a smooth, flattened condition to enable clear and sharp photographs of the document to be obtained.

To these and other ends the invention resides in certain improvements and combinations of parts, all as will be hereinafter more fully described, the novel features being pointed out in the claims at the end of the specification.

In the drawings:

Fig. 4 is a fragmentary vertical section taken substantially on line 4—4 of Fig. 2;

Fig. 5 is a vertical section taken substantially on line 5—5 of Fig. 2;

Fig. 6 is a fragmentary vertical section taken on line 6—6 of Fig. 2 and illustrating the latch mechanism for holding the cover in lowered position; and Fig. 7 is a fragmentary detail illustrating the manner of reinforcing and connecting the corners of the cover frame.

Similar reference numerals throughout the several views indicate the same parts.

The present embodiment of the invention provides an apparatus of the class described which is simple and convenient in operation and capable of being manufactured at moderate cost, being particularly advantageous for use in taking photographs of documents and similar objects and which can be readily handled by relatively unskilled persons to enable a maximum number of documents to be photographed in a minimum amount of time. To this end the invention, as disclosed, is embodied in conjunction with a copying camera of more or less conventional form and comprises a support for positioning the document in proper relation to the lens system of the camera combined with suitable and effective cover means for holding the document in flattened condition on the support.

This application is a continuation in part of my copending application Serial No. 38,844, filed June 22, 1925 (now Patent No. 1,800,007, granted April 7, 1931).

Figure 1:
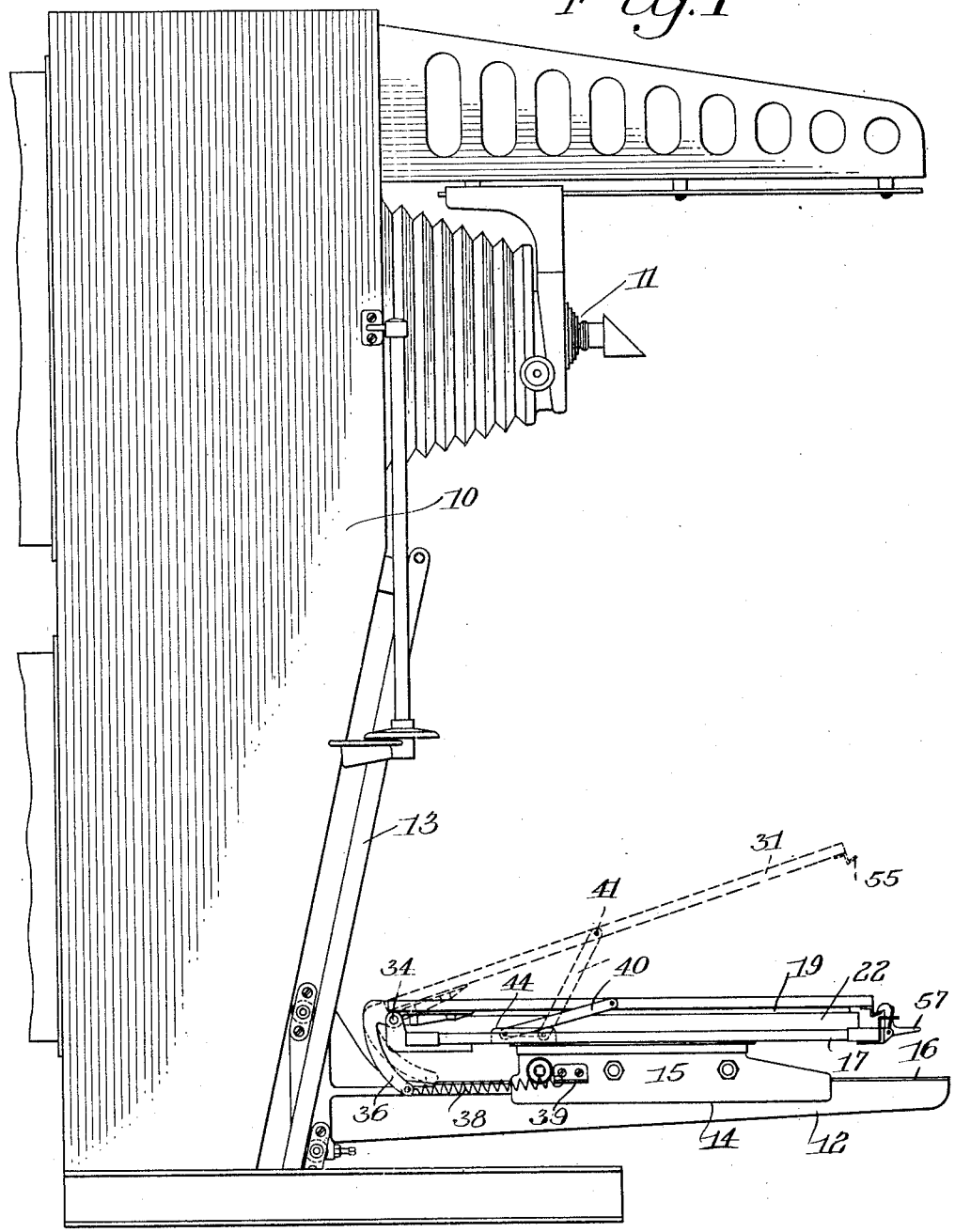
Fig. 1 is a side elevation of a photographic apparatus having incorporated therewith a copyholder embodying the present invention.

Referring more particularly to the drawings, there is shown at 10 in Fig. 1 a casing for a photographic apparatus having a lens system 11 adjustably associated therewith and a support or table 12 vertically adjustable on a track 13 secured on the front face of the casing 10. The support 12 carries the copyholder of the present invention, designated as a whole at 14, for horizontal adjustment thereon so as to vary its position in accordance with the adjustment of the lens system 11.

The copyholder 14 is preferably constructed with a suitable base 15 having guiding means such as wheels or rolls (not shown) for movement on a track 16 on the support 12. Upon the base 15 is disposed a supporting member 17 in the form of a tray or frame having upwardly turned edges 18 for the purpose of stiffening its construction.

Means are provided on the supporting member or tray 17 for yieldingly supporting a document for limited downward movement. For this purpose there is provided a movable panel 19 having a flat upper surface terminating in downwardly and outwardly bent edges 20 at the sides thereof which cooperate with inwardly bent portions 21 on upstanding Z-bars 22 secured adjacent the sides of the tray 17. A plurality of yielding members, such as coil springs 23, are provided which rest on the bottom of the tray 17 and bear upwardly against the lower side of the panel 19 to normally hold it in an upward position in which the edges 20 contact with the edges 21. The portions 20 and 21 thus form cooperative stop members for limiting upward movement of the panel 19 but allow the panel to be moved downwardly against the compression of springs 23.

It will be noted that since the springs are spaced apart beneath the panel 19, they thus act to equalize the pressure on the panel.

The panel 19 preferably carries thereon a suitable means for indicating the position of a document with respect to the optical system. For this purpose, in the present instance, a sheet 24 of cardboard or other suitable material is disposed on the upper surface of the panel 19 and bears certain indicating marks for enabling the operator to correctly position the document thereon.

Means are preferably provided for preventing buckling of the tray 17. For this purpose there is provided a metal channel member 27 somewhat narrower than the front to rear dimension of the tray 17 and approximately as long in its transverse dimension as the distance between the Z-bars 22. This channel member 27 has outwardly flaring edges 28 secured by rivets 29 which pass through the tray 17 and outwardly bent portions 30 on the Z-bars 22.

The document or other paper to be photographed is laid flat on the upper surface of the movable panel 19, and in case it is creased or folded so that it will not lie flat, it is desirable to have means for positively holding it in a flattened condition. For this purpose there is provided a displaceable cover frame 31 having a transparent panel 32 therein, preferably of glass, adapted to press down the upper surface of the document to be photographed. By reference to Figs. 4 and 5 it will be noted that the frame 31 is substantially larger than the panel 19 so that the glass plate 32 extends beyond the edges of the panel at all points, thus providing a uniform contacting surface over the entire top of the panel.

The frame 31 is preferably pivotally mounted with respect to the tray 17. For this purpose there is provided on the tray 17 a pair of hinge brackets 33 carrying pivot pins 34 which pass through pivot apertures in hinge brackets 35 secured by bolts to the frame 31.

Figure 2:
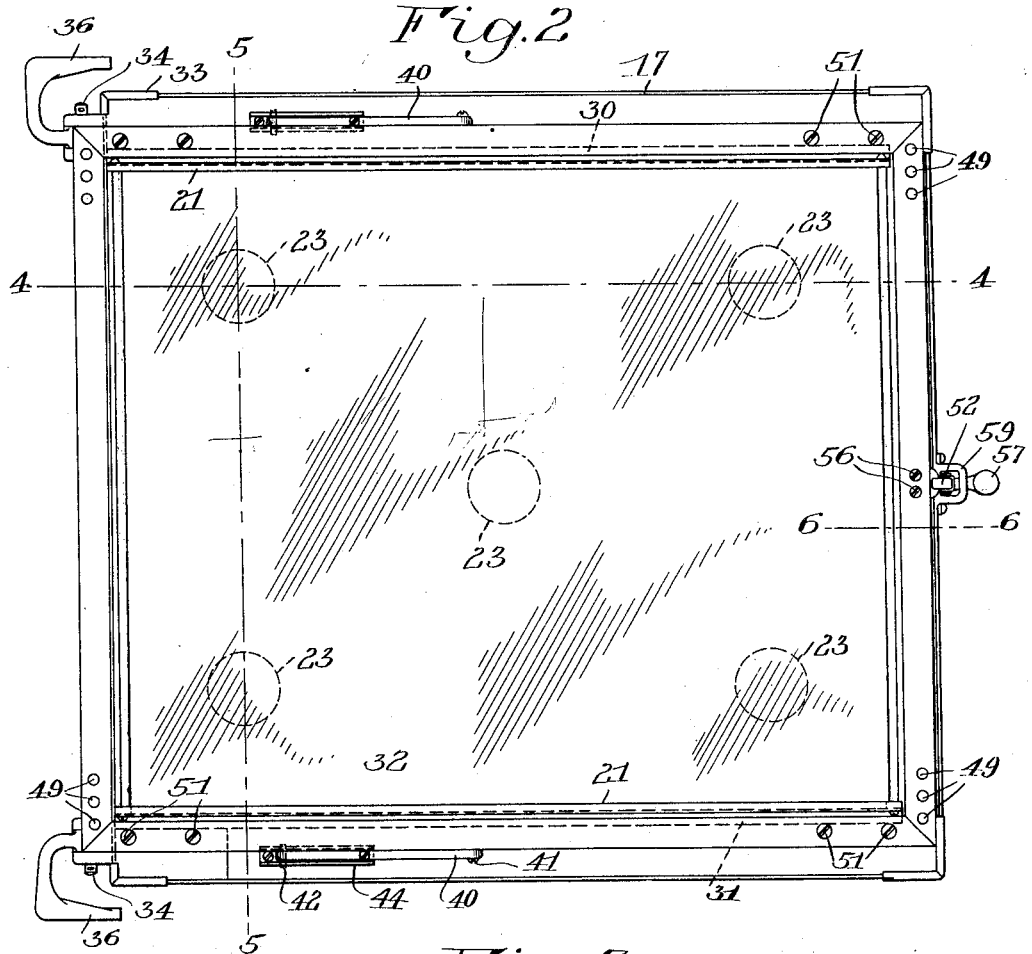
Fig. 2 is a detail plan view of the copyholder.
Figure 3:
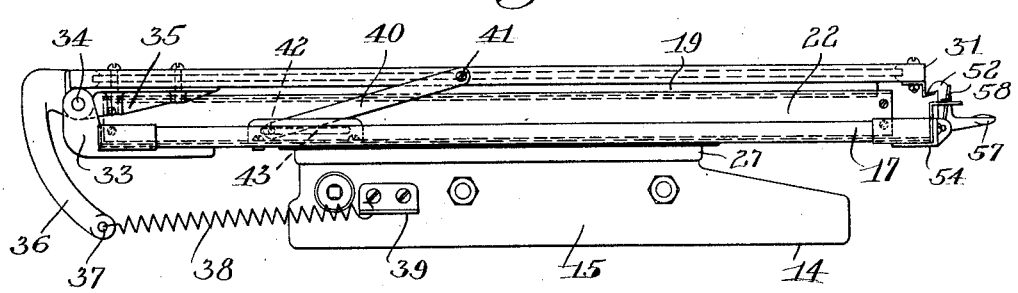
Fig. 3 is a side elevation of the copyholder.

Means are preferably provided for normally holding the frame 31 in an upwardly inclined or inoperative position on its pivots 34 with respect to the tray 17. In the present embodiment there is provided at each rear side corner of the frame on the hinge brackets 35, an outwardly and downwardly extending arm 36 as best shown in Figs. 2 and 3. The arms 36 are provided with apertures 37 at their lower ends for engagement with the end of a coiled spring 38 which is secured at its opposite end in a clip 39 attached at the base 15 of the copyholder. The effect of spring 38 is to pull the ends of arms 36 inwardly and to swing the front edge of the frame 31 upwardly about the pivots 34 to a distance sufficient to allow an operator to readily place a document on the panel 22 and move it therefrom.

Means are preferably provided for limiting the upward swinging movement of the frame 31 about pivots 34. In the present instance there is provided at each side of the tray 17 a link 40 pivotally secured at its upper end at 41 to the side edge of the frame 31. The lower end of the link has a pin 42 fixed therein which engages a horizontal slot 43 in an upstanding bracket 44 secured to the tray 17. As the frame 31 is swung upwardly the lower end of the link 40 carrying the pin 42 moves forwardly on the bracket 44 until the pin 42 reaches the end of the slot 43 thus preventing further upward movement of the frame 31. The cover is thus held in upwardly swung position, substantially as shown by dotted lines in Fig. 1 by the springs 38.

The frame 31 may assume various forms in the present instance formed from fabricated metal shapes 45 having a re-entrant portion 46 on the inner edges thereof providing a groove for retaining the edges of the glass plate 32.

The members 45 of the frame 31 are preferably joined so as to be readily taken apart to facilitate replacement of the glass plate 32 in case of breakage thereof. For this purpose each of the members 45 terminates in a bevelled end at the corners of the frame and the ends are secured together by means of suitable L-shaped reinforcing and connecting members 47 as shown in Fig. 7. One of the arms 48 of the member 47 is permanently secured in each end of the front and rear members 45 as by means of rivets 49. The other ends 50 of the member 47 are removably secured in the side members 45 by means of suitable bolts 51. Thus if it is desired to remove the glass plate 32 for any reason, such as for replacing a cracked plate, the bolts 51 at the front of the frame 31 will be removed so as to allow the front frame member 45 to move forwardly to remove it from the side frame members. The glass plate can now be pulled out and a new one inserted, after which the front frame member will be returned in place and again secured by the bolts 51.

Means are provided for releasably holding or locking the frame 31 in lowered position against the movable panel 19. For this purpose there is provided a latch 52, pivotally mounted at 53 on a bracket 54 secured to the front edge of the tray 17, and engaging with a detent 55 secured to the lower front edge of the frame 31 by suitable means such as bolts 56. The latch 52 has a rearwardly extending arm 57 by depressing which the operator may release the detent 55 from the latch. A spring 58 is associated with the latch for holding it in engagement with the detent 55 so that on the swinging of frame 31 to lowered position the detent momentarily forces the end of the latch 52 back until it has reached its lowermost position at which time the latch will swing inwardly to engage the detent.

A suitable stop member 59 is provided so as to prevent the operator from swinging the latch too far on its pivot 53.

In order to prevent buckling of the tray 17 at the point where the latch is supported, it is desirable to suitably stiffen the front edge of the tray. In the present instance there is provided a suitably bent angle member 60, as shown in Figs. 4 and 6, which is riveted or otherwise secured along its edges to the front portion on the tray 17 thus preventing any buckling effect as will be understood to persons skilled in the art.

In the use and operation of the device the operator selects a document or other flat object which he desires to photograph and places it on the chart 24 while the cover frame is in raised position as shown by dotted lines in Fig. 1. When the document has been properly placed on the chart with respect to the lens system of the camera, the operator will depress the front edge of the frame 31 until the detent 55 is engaged by the latch 52.

It will be seen by a comparison of Figs. 5 and 6 that when the cover frame has been depressed sufficiently to be engaged and held by the latch 52, the panel 19 will be forced downwardly against the action of springs 23 thus holding the document in a thoroughly flat, pressed out condition which is necessary for obtaining suitable sharply focused prints.

In case the document has any inequalities of thickness, this will be taken care of by the equalizing action of the springs 23, so that the surface of the document will be held at all points flat against the lower surface of the glass plate 32.

After the exposure has been made and the operator desires to replace the document by another which he desires to photograph, he simply depresses the arm 57 of the latch 52 whereupon the cover frame 31 automatically swings upwardly through the action of the springs 38 and assisted somewhat at the start by the action of the springs 23. The cover frame 31 will then move to a position as shown by dotted lines in Fig. 1 in which the lower ends of links 40 will be held at the forward ends of the slots 43. The device is thus ready for the insertion of the next document which will be handled in a similar manner as the one described.

The present invention thus provides a light, strong and readily manipulated copyholder formed from simple and rugged parts which are economical to manufacture and easy to assemble, so that they may be readily removed for inspection or replacement. The device, furthermore, has the advantages of ease of handling and speed of operation for permitting the rapid introduction and withdrawal of documents, and at the same time serving to hold the document in a thoroughly flattened out condition necessary for obtaining clear and sharp photographs.

I claim as my invention:

1. In photographic apparatus, a copyholder comprising a movable panel upon which a document may be placed, a displaceable holding member adapted to engage a document on said panel, means for releasably locking said member in document holding position, yielding means for urging said panel against the holding member, means acting automatically upon the release of said locking means for moving said holding member to an inoperative position, and means for limiting the displacing movement of said holding member comprising a jointed link connected thereto and to a fixed part of the device, the parts of which link have a slot and pin connection with each other.

2. In a copyholder for photographic apparatus, a copy supporting means, a cover frame, pivot means connecting said supporting means and said cover frame, an arm on said cover frame extending to the other side of said pivot from said cover frame and downwardly below the supporting means and a spring connecting the extended end of said arm and said supporting means and arranged under and substantially parallel with the latter for urging said cover to a position in which it is swung away from said supporting means.

3. A photographic copyholder comprising, in combination, a supporting member, a holding member for retaining an article to be copied, a pivotal connection between said supporting member and said holding member, resilient means tending to swing said holding member about said pivotal connection to an inoperative position, a slot in one of said members, and a link pivoted to the other of said members and having a portion engaging and slidable in said slot to provide a smooth acting stop means for limiting the motion of said holding member under the influence of said resilient means.

4. A photographic copyholder comprising, in combination, a supporting member, a holding member for retaining an article to be copied, a pivotal connection between said supporting member and said holding member, an arm attached to said holding member adjacent said pivotal connection and extending at an angle to said holding member, and a spring extending approximately parallel to said holding member when the latter is in its holding position, one end of said spring being connected to said arm to tend to swing said holding member about said pivotal connection to an inoperative position.

5. A phtographic copyholder comprising, in combination, a supporting plate, upstanding flanges on said plate, a panel within said flanges and guided thereby for movement toward and away from said plate, resilient means between said panel and said plate tending to move said panel away from said plate, inturned flanges adjacent the edges of said upstanding flanges for limiting the movement of said panel under the influence of said resilient means, and a holding member associated with said panel so that articles to be photographed may be pressed against said holding member by said panel.

6. A photographic copyholder comprising, in combination, a frame, a panel for supporting articles to be photographed, resilient means tending to urge said panel away from said frame, outwardly extending flanges on said panel in a plane rearwardly of the article supporting face thereof, and inwardly extending flanges on said frame cooperating with said outwardly extending flanges on the panel to limit movement thereof under the influence of said resilient means.

ARTHUR W. CAPS.